United States Patent [19]

Sygnator

[11] 3,863,526

[45] Feb. 4, 1975

[54] METHOD OF FORMING A DIE SECTION

[75] Inventor: Henry Anton Sygnator, Arlington Heights, Ill.

[73] Assignee: Illinois Tool Works, Inc., Chicago, Ill.

[22] Filed: Aug. 5, 1974

[21] Appl. No.: 494,960

Related U.S. Application Data

[62] Division of Ser. No. 319,279, Dec. 29, 1972, Pat. No. 3,835,495.

[52] U.S. Cl.................. 76/107 R, 72/377, 10/10 R
[51] Int. Cl.............................................. B21k 5/20
[58] Field of Search...... 76/107 R; 10/10 R; 72/467, 72/377

[56] References Cited
UNITED STATES PATENTS

| | | | |
|---|---|---|---|
| 2,354,924 | 8/1944 | Meakin | 76/107 R |
| 2,498,114 | 2/1950 | Penrod | 76/107 R |
| 3,104,161 | 9/1963 | Carlson | 10/10 R |
| 3,384,911 | 5/1968 | Carlson | 10/10 R |
| 3,423,778 | 1/1969 | Morse | 85/41 X |
| 3,461,470 | 8/1969 | Cochrum | 10/10 R |
| 3,728,750 | 4/1973 | Stillman | 10/10 R |

*Primary Examiner*—Leonidas Vlachos
*Attorney, Agent, or Firm*—Robert W. Beart; Thomas W. Buckman

[57] ABSTRACT

The present invention relates generally to improvements in methods and mechanisms for swaging the entering portion of a screw blank, and more specifically to novel methods and mechanisms for producing screw blanks having laterally offset, substantially conical entering or work swaging portions and a pilot extending therefrom. The invention as disclosed herein contemplates the use of a novel die arrangement wherein a first die section is provided with an openended cylindrical bore for telescopically accommodating a screw blank of corresponding size. An adjacently positioned second die section having a substantially conical bore is adapted to receive the entering extremity of a screw blank from the first die section. The substantially conical bore is offset or displaced laterally with respect to the bore in the first die section. This second die section is positioned intermediate the first die section and a third die section having a pilot-forming bore the central axis of which is coincident with the bore of the first die section.

3 Claims, 14 Drawing Figures

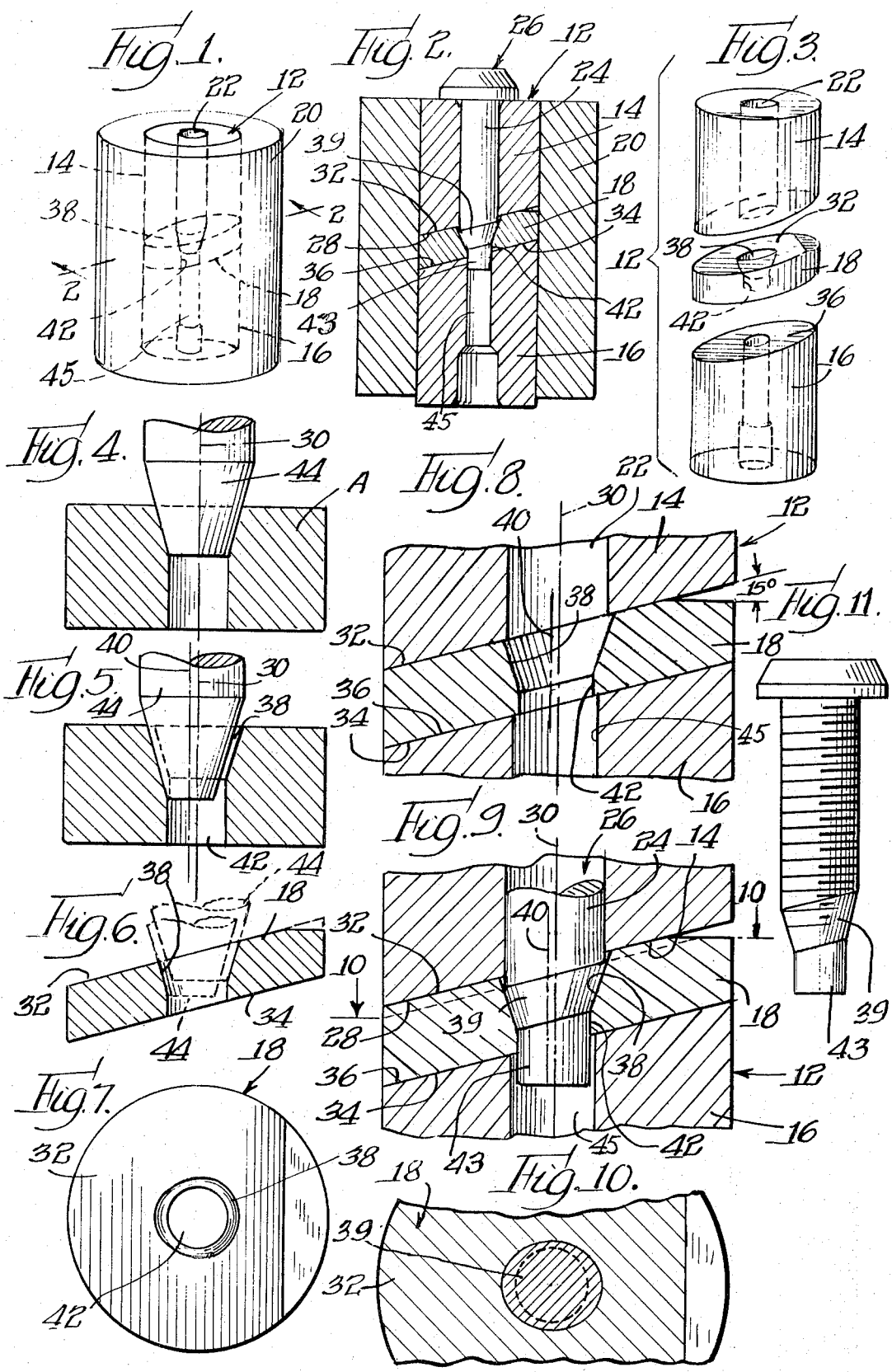

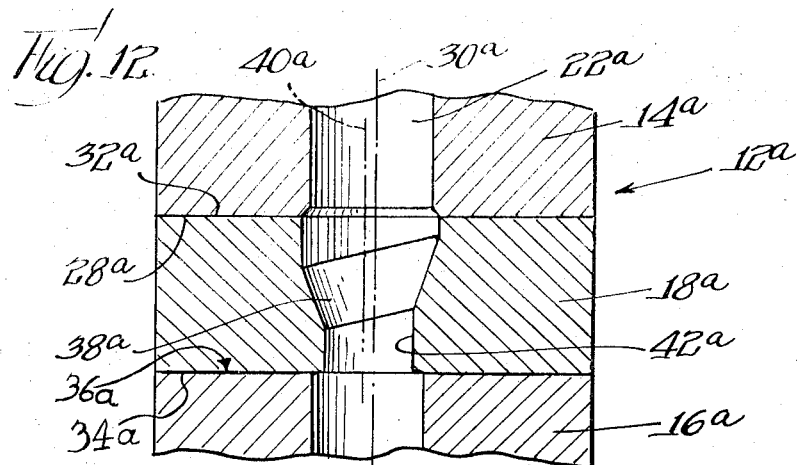
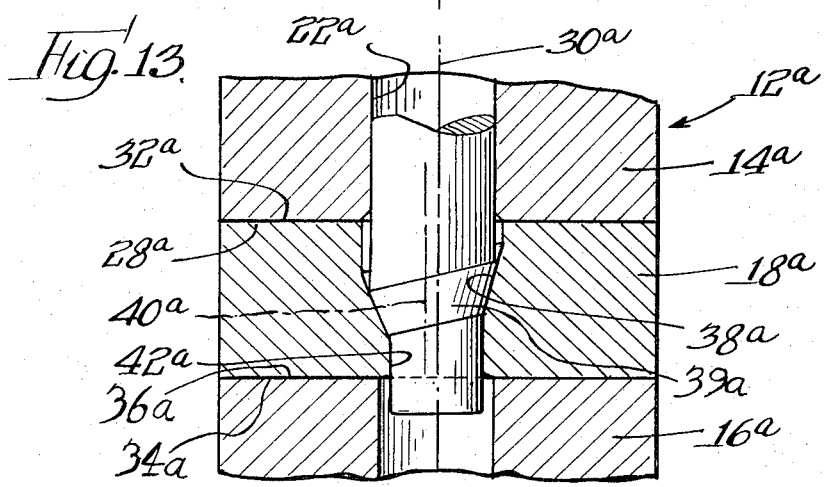
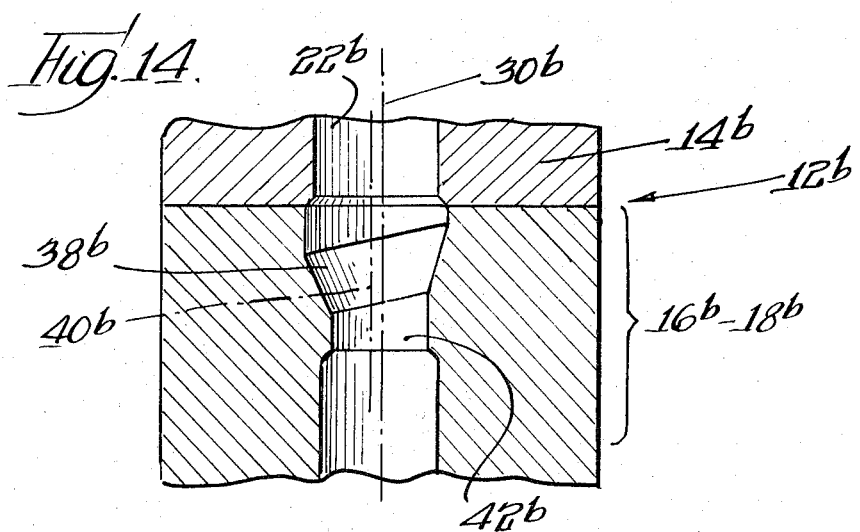

METHOD OF FORMING A DIE SECTION

This is a division of application Ser. No. 319,279, filed Dec. 29, 1972 now U.S. Pat. No. 3,835,495.

SUMMARY OF THE INVENTION

Applicant heretofore developed a novel extruding and threadforming screw fastener in which a work swaging substantially conical section is interposed between a pilot section and a cylindrical threaded shank or holding section. In such a fastener the conical section is offset laterally with respect to said cylindrical threaded section and said axially extending pilot section. It is an object of the present invention to provide novel and practical methods and means for producing screw blanks from which the above mentioned type fasteners may be formed.

More specifically, the present invention contemplates a die arrangement and method which enables the economical production of laterally offset substantially conical sections of a screw blank of the type referred to above.

It is a further object of the present invention to provide a novel die arrangement comprising a plurality of separable die sections, each section having a central bore of predetermined contour, said die sections when in stacked relation providing a continuous novel bore arrangement for telescopically accommodating and swaging the entering portion of a screw blank.

BRIEF DESCRIPTION OF THE DRAWINGS

The foregoing and other objects and advantages will be more apparent from the following detailed description when considered in connection with the accompanying drawings wherein:

FIG. 1 is a perspective view illustrating a die assembly of the type contemplated by the present invention, secured within an annular holder in readiness to telescopically accommodate a cylindrical screw blank;

FIG. 2 is a central, longitudinal sectional view of the die sections and holder therefor, said view being taken substantially along the line 2—2 of FIG. 1;

FIG. 3 is a perspective exploded view of the three sections which comprise the die arrangement or assembly shown in FIGS. 1 and 2;

FIG. 4 discloses a centrally apertured cylindrical member or cylinder from which the intermediate die section may be produced, a swaging tool being disclosed in association therewith to illustrate the first swaging step in the formation of a substantially conical bore;

FIG. 5 is a view similar to FIG. 4 illustrating the manner in which the swaging tool is laterally offset to form a substantially conical bore laterally offset with respect to the cylindrical bore of the upper or first die section, as illustrated in FIGS. 1 to 3, inclusive;

FIG. 6 discloses the intermediate or second die section or wafer formed from the cylindrical die member illustrated in FIGS. 4 and 5;

FIG. 7 is a plan view of the intermediate die section or wafer shown in FIG. 6;

FIG. 8 is an enlarged fragmentary central sectional view of the intermediate or second die section and the first and third die sections positioned on opposite sides thereof, more clearly to illustrate the surface contour of that portion of the intermediate die section which is employed to form the laterally offset substantially conical surface in a screw blank;

FIG. 9 is a view similar to FIG. 8 illustrating the position occupied by the screw blank after complete telescopic association of the blank and the die assembly has taken place;

FIG. 10 is a transverse sectional view taken substantially along the line 10-10 of FIG. 9;

FIG. 11 is a side elevational view of a screw fastener incorporating the laterally offset conical portion produced by practicing the method and employing the die assembly or mechanism contemplated by the present invention;

FIG. 12 is a fragmentary vertical section similar to FIG. 8, illustrating a die assembly of modified form;

FIG. 13 is a sectional view similar to FIG. 12, illustrating the position occupied by a screw blank after complete telescopic association of the blank and die assembly has occurred; and FIG. 14 is a fragmentary vertical sectional view similar to FIG. 12, illustrating a die assembly of further modified form contemplated by the present invention.

DESCRIPTION OF A PREFERRED EMBODIMENT OF THE INVENTION

Referring now to the drawings more in detail, wherein like numerals have been employed to designate similar parts throughout the various figures, it will be seen that one embodiment of the present invention includes a die arrangement or assembly designated generally by the numeral 12. This die arrangement 12 comprises three die sections, namely, end sections 14 and 16 and an intermediate, wafer-like section 18. The sections 14, 16 and 18 may be held together as a unit by means of a suitable collar 20, FIGS. 1 and 2. The die section 14, hereinafter referred to as the first die section, is provided with a central open-ended cylindrical bore 22 for telescopically accommodating the elongate cylindrical shank 24 of a screw blank 26. The inner extremity of the cylindrical die section 14 is defined by a surface 28 which is inclined at approximately fifteen degrees with respect to the central axis of the bore 22. This central axis of the die member 14 is indicated by dot-and-dash lines 30.

Mounted in flush engagement with the aforesaid surface 28 is a surface 32 of the intermediate or second wafer-like die section 18. The underside or surface 34 of the wafer-like die section 18 engages an upper complementary surface 36 of the third die section 16. The wafer-like die section 18 is provided with a central substantially conical bore 38. Attention is directed to the fact that the bore 38 is laterally offset with respect to said cylindrical bore 20, as illustrated in FIGS. 5, 8 and 9. The extent of said lateral offset is indicated by the distance between the dot-and-dash line 30 and a parallel dot-and-dash line 40. A more detailed explanation of the formation of this laterally displaced, substantially conical section is later set forth herein. Die section 18 is also provided with a central pilot-forming bore 42, the central axis of which is coincident with the central axis, dot-and-dash line 30, of the bore 22. In other words, the dot-and-dash lines 30 designates the central axis of the bore 22 and the central axis of the pilot-forming bore 42. The diameter of the bore 42 is obviously smaller than the diameter of the bore 22, its size being dependent upon the required size of the pilot to be formed thereby. It will be noted that the upper portion of the pilot-forming bore 42 opens into the lower or minimum diameter of the bore 38, FIGS. 8 and 9.

The third die section 16 is provided with a central bore 45 which may be an extension of the pilot forming bore 42. In accordance with conventional cold-heading techniques, however, this bore 45 may be slightly larger than bore 42 to provide clearance for the stock.

In FIGS. 4 to 6, inclusive, is disclosed the manner in which the laterally offset, substantially conical bore 38, and the wafer-like die section is produced. A swaging tool 44 is employed to initially produce a conical bore having an axis coincident with the axis 30 by applying said tool to the central aperture of a cylindrical workpiece A, as illustrated in FIG. 4. The cylindrical aperture in the workpiece A corresponds in size to the previously mentioned pilot forming bore 42, and by telescopically associating the swaging tool 44 with said aperture the formation of the aforesaid substantially conical bore 38 is initiated. Following the initial formation of the conical opening illustrated in FIG. 4, the swaging tool 44 is eccentrically positioned with respect to the axis 30, and again moved into swaging engagement with the workpiece A to a greater depth, thereby slightly enlarging the conical bore, as illustrated in FIGS. 5 and 6. This results in the final formation of the bore 38 of substantially conical contour disposed laterally with respect to the cylindrical bore 42. After completion of the bore 38, the upper and lower portions of the workpiece A are ground or cut away, so as to present the wafer-like die section 18, as shown in FIG. 6. This modified but substantially conical bore 38 functions to produce a complementary conical section 39 at the entering portion of the screw blank 26. The bore 38, when viewed in plan, as illustrated in FIG. 7, is elliptical or substantially egg-shaped.

In FIGS. 12 and 13, a modified die assembly 12a is shown. Like the previously described assembly, the assembly 12a is comprised of three sections, namely a first section 14a, a second section 16a and an intermediate or third section 18a. The lower side of the section 14a is defined by a surface 28a which abuts the upper side of the intermediate die section 18a defined by a surface 32a. Abutting surfaces 34a and 36a are parallel to the surfaces 28a and 32a, said surfaces extending at right angles to the axis 30a of coaxial cylindrical bores 22a and 42a. A lower portion of the cylindrical bore 22a is continued into the upper portion of the third die section, and communicates with a substantially conical bore 38a offset laterally with respect to the cylindrical coaxial bores 22a and 42a.

Particular attention is directed to the fact that the lower extremities of the substantially conical bores 38 and 38a in the vicinity of the juncture thereof with the cylindrical pilot forming bores 42 and 42a, respectively, in transverse section, define planes inclined at an acute angle with respect to the axes 30 and 30a, respectively. Similarly, the upper extremities of said substantially conical bores 38 and 38a in the vicinity of the juncture thereof with cylindrical shank forming bores 22 and 22a, respectively, in transverse section, define planes inclined at an acute angle with respect to said axes 30 and 30a, and parallel with the complementary inclined planes previously mentioned.

It should also be noted that while the bores or cavities 38 and 38a are substantially conical in shape, the larger or upper extremities thereof have a minor diameter equal to the diameter of the cylindrical cavities 22 and 22a, respectively, and a major diameter slightly larger than said cylindrical bores 22 and 22a, as illustrated in FIGS. 2, 8, 9, 12 and 13. Thus, as a screw blank is telescopically associated with the die assembly a desired substantially conical work swaging surface 39 – 39a is formed.

FIG. 14 illustrates a further modified die assembly indicated generally by the numeral 12b. This die assembly 12b is structurally similar to the die assembly 12a, the only structural difference being that the lower portion of the assembly is of integral construction designated by numerals 16b - 18b. In all other respects the die assembly 12b is structurally and functionally similar to the previously described die assembly 12a. Structural details of the assembly 12b corresponding with those previously mentioned are indicated by similar numerals bearing the suffix (b). As previously mentioned, the minor diameter at the upper extremity of the substantially conical bore is equal to the diameter of the elongate cylindrical bore, namely, the shank forming bores or cavities 22, 22a and 22b. The maximum diameter of said conical bore is slightly greater than the diameter of the longitudinal cylindrical bore, and as the screw blank is forced longitudinally into the die assembly the aforesaid minimum and maximum diameter will result. In other words, the substantially conical bore of the die assembly is laterally offset with respect to the coaxially aligned cylindrical bores thereof so as to enable the formation of a complementary screw blank having a corresponding, laterally offset substantially conical work swaging section. It will also be noted that the upper extremity of the substantially conical bore at the juncture thereof with the lower extremity of the elongate cylindrical bore defines a transverse plane disposed at an acute angle with respect to the common axis of the longitudinal and pilot forming cylindrical bores. Likewise, the lower extremity of said substantially conical bore at the juncture thereof with the pilot forming bore defines a transverse plane substantially parallel with the above mentioned plane.

It is the above described laterally offset disposition of the substantially conical die cavity which imparts a corresponding contour to the work swaging section of a completed screw blank. After thread convolutions have been formed on the blank as illustrated in FIG. 11, and the screw is rotatably applied to an apertured workpiece, the substantially conical, laterally offset section of the screw swagingly engages the workpiece and thereby reduces the force necessary to rotate the screw in the work.

The present invention contemplates other modifications and changes without departing from the spirit and scope of the appended claims.

I claim:

1. A method of forming a die section to be used in forming the entering portion of a cylindrical screw blank including the steps of providing a die section with a central bore, forming a conical recess in the die section coaxial with the central bore, deforming the conical recess by engaging the recess with a forming tool positioned along an axis laterally displaced from the central axis and to a depth greater than the conical recess.

2. A method of forming a die section in accordance with claim 1 wherein the initial conical recess and subsequent deformation therein are formed by the same tool.

3. A method of forming a die section in accordance with claim 1 wherein the conical recess and subsequent deformation therein are accomplished by swaging the central bore with a conical swaging tool.

* * * * *